United States Patent
Tang et al.

(10) Patent No.: US 11,309,977 B2
(45) Date of Patent: Apr. 19, 2022

(54) CALIBRATION METHOD AND COMMUNICATIONS DEVICE

(71) Applicant: HUAWEI TECHNOLOGIES CO., LTD., Guangdong (CN)

(72) Inventors: Yi Tang, Chengdu (CN); Zhiwei Zhang, Shanghai (CN); Feng Li, Dongguan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/111,319

(22) Filed: Dec. 3, 2020

(65) Prior Publication Data

US 2021/0091863 A1  Mar. 25, 2021

Related U.S. Application Data

(63) Continuation of application No. PCT/CN2019/104458, filed on Sep. 4, 2019.

(30) Foreign Application Priority Data

Sep. 4, 2018 (CN) .......................... 201811028333.X

(51) Int. Cl.
*H04B 17/12* (2015.01)
*H04B 17/21* (2015.01)

(52) U.S. Cl.
CPC ............. *H04B 17/12* (2015.01); *H04B 17/21* (2015.01)

(58) Field of Classification Search
CPC ........ H04B 17/12; H04B 17/14; H04B 17/20; H04B 17/21; H04W 4/02
See application file for complete search history.

(56) References Cited

U.S. PATENT DOCUMENTS 9,705,611 B1    7/2017  West
10,629,998 B2*  4/2020  Lim ..................... G01S 7/4815
(Continued)

FOREIGN PATENT DOCUMENTS

CN    101351978 A    1/2009
CN    102445177 A    5/2012
(Continued)

OTHER PUBLICATIONS

Extended European Search Report issued in European Application No. 19857373.5 dated May 18, 2021, 9 pages.
(Continued)

*Primary Examiner* — Thanh C Le
(74) *Attorney, Agent, or Firm* — Fish & Richardson P.C.

(57) ABSTRACT

Embodiments of the present application relate to the communications field and disclose a calibration method and a communications device, capable of compensating for measured amplitude and phase results. The method includes determining a position error of each of the N antenna groups, and then determining an actual position of the antenna group based on a target position of the antenna group and the position error of the antenna group. A phase compensation value and/or an amplitude compensation value of the antenna group are determined for a target probe of the second device based on the actual position of the antenna group. Based on the phase compensation value and/or the amplitude compensation value of the antenna group, compensating is performed for a phase result and/or an amplitude result that are/is obtained by the target probe of the second device by measuring a signal transmitted by the antenna group.

16 Claims, 6 Drawing Sheets

(56) References Cited

U.S. PATENT DOCUMENTS

| | | | |
|---|---|---|---|
| 2003/0224750 A1 | 12/2003 | Sampath | |
| 2006/0276136 A1 | 12/2006 | Karlsson | |
| 2011/0122016 A1 | 5/2011 | Lomes et al. | |
| 2017/0033876 A1* | 2/2017 | Oshima | H04B 7/04 |
| 2020/0227824 A1* | 7/2020 | Abdalla | H01Q 21/0025 |
| 2020/0266535 A1* | 8/2020 | Rafique | H04B 17/14 |
| 2021/0257730 A1* | 8/2021 | Ma | H04B 17/12 |

FOREIGN PATENT DOCUMENTS

| | | |
|---|---|---|
| CN | 102738551 A | 10/2012 |
| CN | 103064056 A | 4/2013 |
| CN | 104953283 A | 9/2015 |
| CN | 106291129 A | 1/2017 |
| CN | 106324573 A | 1/2017 |
| CN | 107315183 A | 11/2017 |
| CN | 107800495 A | 3/2018 |
| CN | 108155958 A | 6/2018 |
| CN | 108322268 A | 7/2018 |
| CN | 108462540 A | 8/2018 |
| CN | 109309533 A | 2/2019 |
| EP | 3276747 A1 | 1/2018 |

OTHER PUBLICATIONS

Office Action issued in Chinese Application No. 201811028333.X dated Mar. 3, 2021, 4 pages.
Office Action issued in Chinese Application No. 201811028333.X dated Dec. 18, 2019, 10 pages.
Office Action issued in Chinese Application No. 201811028333.X dated Jun. 1, 2020, 12 pages.
PCT International Search Report and Written Opinion issued in International Application No. PCT/CN2019/104458 dated Nov. 26, 2019, 15 pages (with English translation).

* cited by examiner

CALIBRATION METHOD AND COMMUNICATIONS DEVICE

CROSS-REFERENCE TO RELATED APPLICATIONS

This application is a continuation of International Application No. PCT/CN2019/104458, filed on Sep. 4, 2019, which claims priority to Chinese Patent Application No. 201811028333.X, filed on Sep. 4, 2018. The disclosures of the aforementioned applications are hereby incorporated by reference in their entireties.

TECHNICAL FIELD

Embodiments of this application relate to the communications field, and in particular, to a calibration method and a communications device.

BACKGROUND

The massive multi-input and multi-output (Massive-MIMO) technology based on phased array antennas is widely used in 5G communications systems. A phased array antenna may be deployed for both a network device and a terminal device. The phased array antenna is an antenna array including a plurality of antenna groups whose phases (or delays) can be independently controlled based on a specific spatial layout.

When designing the phased array antenna, it is necessary to control the amplitude and the phase of the signal transmitted by the phased array antenna to a certain extent by controlling factors such as positions of antenna elements, so as to ensure that the performance of the phased array antenna is not affected. However, it is difficult to ensure that the amplitude and the phase of the phased array antenna achieve the expected effect after the device is delivered from the factory due to factors such as different device positions, different board-making materials, and the mutual coupling between the antennas, thereby affecting the performance of the phased array antenna.

In the prior art, a probe may be provided at a far-field boundary, and amplitude and phase of a phased array antenna are calibrated based on a measurement result of the probe, so that the system is large in volume and high in costs; alternatively, a high-precision gantry and turntable are calibrated one by one using a high-cost, high-precision antenna group, which results in high costs, a large volume, a low calibration efficiency, and therefore is unsuitable for production use.

SUMMARY

Embodiments of this application provide a calibration method and a communications device, to compensate for amplitude and phase deviations caused by a position error of a device in a short distance by using a small-sized calibration system, so as to calibrate an amplitude and a phase of a phased array antenna, thereby reducing costs while ensuring performance of the phased array antenna, and facilitating extensive deployment of the calibration system.

To achieve the above object, the embodiments of this application adopt the following technical solutions:

According to a first aspect, a calibration method is disclosed, where the method is applied to an antenna array amplitude-phase calibration system; the antenna array amplitude-phase calibration system includes a first device, a second device, and a third device connected to the first device and the second device; the first device includes N antenna groups, where N is an integer greater than 1; the second device includes at least three probes; and a distance between the first device and each of the at least three probes is less than a far field boundary distance. The method includes: first determining, by the third device, a position error of each of the N antenna groups; then for each of the N antenna groups, determining, by the third device, an actual position of the antenna group based on a target position of the antenna group and a position error of the antenna group, and determining a phase compensation value and/or an amplitude compensation value of the antenna group for a target probe based on the actual position of the antenna group, where the target probe is any one of the at least three probes; and finally for each of the N antenna groups, compensating, by the third device based on the phase compensation value of the antenna group, for a phase result that is obtained by the target probe by measuring a signal transmitted by the antenna group, to calibrate a phase of the signal transmitted by the antenna group; and/or compensating, based on the amplitude compensation value of the antenna group, for an amplitude result that is obtained by the target probe by measuring a signal transmitted by the antenna group, to calibrate an amplitude of the signal transmitted by the antenna group.

According to the method provided in this embodiment of the present invention, the measurement result of the measurement device (that is, the second device in this embodiment of the present invention) can be calibrated within a medium-near field distance, so as to compensate for the amplitude and phase deviations that are caused by the antenna group position error of a measured device (that is, the first device in this embodiment of the present invention). Specifically, a position error of each antenna group of the first device is first determined; the actual position of the antenna group is determined based on the target position of the antenna group and the position error of the antenna group, and further, the phase compensation value and/or the amplitude compensation value of the antenna group for the target probe may be determined based on the actual position of the antenna group. Finally, based on the measured signal phase result, the measured signal amplitude result is compensated for, and the measured signal phase result is compensated for. That is, according to this embodiment of the present invention, the amplitude and phase deviations caused by a hardware factor (for example, a position error) of the antenna group can be compensated for within a short distance by using a small-sized system, so that the amplitude consistency and phase consistency of the phased array antenna can be calibrated, and the performance of the phased array antenna is ensured. Further, the amplitude and phase of the phased array antenna can be calibrated by using an existing device of the device, without adding expensive devices such as a high-precision gantry and a turntable, thereby greatly reducing the costs and facilitating extensive deployment of the antenna array amplitude-phase calibration system.

With reference to the first aspect, in a first possible implementation of the first aspect, the determining, by the third device, a position error of each of the N antenna groups specifically includes: determining a target antenna group set, where the target antenna group set includes some of the N antenna groups, or the target antenna group set includes the N antenna groups; obtaining a phase difference corresponding to each antenna group in the target antenna group set, where the phase difference corresponding to the antenna group is a difference between phases when a signal transmitted by the antenna group reaches any two of the at least three probes; for each antenna group in the target antenna group set, calculating a measured wave path difference of the antenna group based on the phase difference corresponding to the antenna group, where the measured wave path difference corresponding to the antenna group is a difference between wave paths when the signal transmitted by the antenna group reaches any two of the at least three probes; and determining the position error of each of the N antenna groups based on the measured wave path differences corresponding to all the antenna groups in the target antenna group set.

This embodiment of the present invention provides a possible implementation for determining the position error of an antenna group. Specifically, the position error of the antenna group can be determined based on the phase difference and the wave path difference when the signal transmitted by some antenna groups of the first device reaches different probes.

With reference to the first possible implementation of the first aspect, in a second possible implementation of the first aspect, the calculating, by the third device, a measured wave path difference of the antenna group based on the phase difference corresponding to the antenna group specifically includes: calculating the measured wave path difference $d_i$ corresponding to the antenna group based on $d_i = \varphi_i \times \lambda \div 360$, where $\varphi_i$ is $i^{th}$ phase difference corresponding to the antenna group in degrees; $\lambda$ is a wavelength of a signal transmitted by the antenna group; and i is an integer greater than or equal to 1.

This embodiment of the present invention provides a specific implementation for deriving the wave path difference corresponding to the antenna group based on the phase difference corresponding to the antenna group.

With reference to the second possible implementation of the first aspect, in a third possible implementation of the first aspect, the determining, by the third device, the position error of each of the N antenna groups based on the measured wave path differences corresponding to all the antenna groups in the target antenna group set specifically includes: for each antenna group in the target antenna group set, determining a predicted position error of the antenna group; determining a predicted wave path difference corresponding to the antenna group based on the predicted position error of the antenna group; substituting the measured wave path difference corresponding to each antenna group in the target antenna group set and the predicted wave path difference corresponding to each antenna group in the target antenna group set into an objective function; and using a position error of an optimal solution when the objective function obtains a minimum value as the position error of each of the N antenna groups, where the objective function is used to represent a difference between the predicted wave path difference corresponding to the antenna group and the measured wave path difference corresponding to the antenna group, and the larger the difference between the predicted wave path difference corresponding to the antenna group and the measured wave path difference corresponding to the antenna group, the larger a value of the objective function.

This embodiment of the present invention provides a specific implementation for determining a position error of an antenna group based on a predicted wave path difference corresponding to the antenna group. Specifically, the predicted wave path difference corresponding to the antenna group may be used as an input of the objective function, and a position error that minimizes the difference between the predicted wave path difference corresponding to the antenna group and the measured wave path difference corresponding to the antenna group is obtained by solving an optimal solution problem of the objective function.

With reference to the third possible implementation of the first aspect, in a fourth possible implementation of the first aspect, the objective function is:

$$E(x_1, x_2 \ldots x_k) = \Sigma_{i=1}^{M} (G_i - F_i(x_1, x_2 \ldots x_k))^2 / M$$

where the predicted position errors of the antenna array of the first device in k dimensions are $x_1, x_2 \ldots x_k$, the antenna array includes N antenna groups, M is the quantity of antenna groups in the target antenna group set, M is an integer greater than or equal to 1 and less than or equal to N, $G_i$ is the measured wave path difference corresponding to the $i^{th}$ antenna group in the M antenna groups, and $F_i(x_1, x_2 \ldots x_k)$ is the predicted wave path difference corresponding to the $i^{th}$ antenna group in the M antenna groups; and i is an integer greater than or equal to 1.

This embodiment of the present invention provides a specific implementation of the objective function. The objective function is not limited to the foregoing implementation, but may be a function in another form. The objective function can be used to represent a difference between the predicted wave path difference corresponding to the antenna group and the measured wave path difference corresponding to the antenna group. The specific form of the objective function is not limited in this embodiment of the present invention.

With reference to the first aspect, in a fifth possible implementation of the first aspect, the compensating, by the third device based on the phase compensation value of the antenna group, for a phase result that is obtained by the target probe by measuring a signal transmitted by the antenna group, to calibrate a phase of the signal transmitted by the antenna group specifically includes: determining a wave path of the signal transmitted by the antenna group to the target probe based on the actual position of the antenna group, determining the phase of the signal transmitted by the antenna group to the target probe based on the wave path of the signal transmitted by the antenna group to the target probe, and determining the phase compensation value of the antenna group to the target probe based on the phase of the signal transmitted by the antenna group to the target probe.

This embodiment of the present invention provides a specific implementation for compensating for the measured phase result.

With reference to the first aspect, in a sixth possible implementation of the first aspect, the compensating, by the third device based on the amplitude compensation value of the antenna group, for an amplitude result that is obtained by the target probe by measuring a signal transmitted by the antenna group, to calibrate an amplitude of the signal transmitted by the antenna group specifically includes:

determining an orientation of the antenna group relative to the target probe based on the actual position of the antenna group, determining an amplitude deviation of the signal transmitted by the antenna group from the target probe based on the orientation of the antenna group relative to the target probe, and determining the amplitude compensation value of the antenna group for the target probe based on the amplitude deviation of the signal transmitted by the antenna group from the target probe.

This embodiment of the present invention provides a specific implementation for compensating for the measured amplitude result.

With reference to the first aspect, in a seventh possible implementation of the first aspect, the method further includes: for each of the N antenna groups, compensating, by the third device based on the phase compensation value of the antenna group, for a phase result that is obtained by the antenna group by receiving a signal transmitted by the target probe, to calibrate a phase of the signal transmitted by the target probe; and/or compensating, based on the amplitude compensation value of the antenna group, for an amplitude result that is obtained by the antenna group by receiving the signal transmitted by the target probe, to calibrate an amplitude of the signal transmitted by the target probe.

In this embodiment of the present invention, the first device may also receive a signal that is transmitted by the second device through an antenna group, and the first device may also measure the amplitude and phase of the signal transmitted by the second device. According to the method provided in this embodiment of the present invention, an amplitude result and a phase result obtained by measuring a signal transmitted by the second device can also be compensated for.

According to a second aspect, a communications device is disclosed, where the device is a third device in an antenna array amplitude-phase calibration system; the antenna array amplitude-phase calibration system includes a first device, a second device, and a third device connected to the first device and the second device; the first device includes N antenna groups, where N is an integer greater than 1; the second device includes at least three probes; and a distance between the first device and each of the at least three probes is less than a far field boundary distance. The third device includes: a determining unit, configured to determine a position error of each of the N antenna groups, where the determining unit is further configured to: for each of the N antenna groups, determine an actual position of the antenna group based on a target position of the antenna group and a position error of the antenna group, and determine a phase compensation value and/or an amplitude compensation value of the antenna group for a target probe based on the actual position of the antenna group, where the target probe is any one of the at least three probes; and a compensation unit, configured to: for each of the N antenna groups, compensate, by the third device based on the phase compensation value of the antenna group, for a phase result that is obtained by the target probe by measuring a signal transmitted by the antenna group, to calibrate a phase of the signal transmitted by the antenna group; and/or compensate, based on the amplitude compensation value of the antenna group, for an amplitude result that is obtained by the target probe by measuring a signal transmitted by the antenna group, to calibrate an amplitude of the signal transmitted by the antenna group.

The device provided in the embodiment of the present invention can calibrate the measurement result of the measurement device (that is, the second device in the embodiment of the present invention) within a medium-near field distance, so as to compensate for the amplitude and phase deviations that are caused by the antenna group position error of a measured device (that is, the first device in the embodiment of the present invention). Specifically, a position error of each antenna group of the first device is first determined; the actual position of the antenna group is determined based on the target position of the antenna group and the position error of the antenna group, and further, the phase compensation value and/or the amplitude compensation value of the antenna group for the target probe may be determined based on the actual position of the antenna group. Finally, based on the measured signal phase result, the measured signal amplitude result is compensated for, and the measured signal phase result is compensated for. That is, according to this embodiment of the present invention, the amplitude and phase deviations caused by a hardware factor (for example, a position error) of the antenna group can be compensated for within a short distance by using a small-sized system, so that the amplitude consistency and phase consistency of the phased array antenna can be calibrated, and the performance of the phased array antenna is ensured. Further, the amplitude and phase of the phased array antenna can be calibrated by using an existing device of the device, without adding expensive devices such as a high-precision gantry and a turntable, thereby greatly reducing the costs and facilitating extensive deployment of the antenna array amplitude-phase calibration system.

With reference to the second aspect, in a first possible implementation of the second aspect, the determining unit is specifically configured to: determine a target antenna group set, where the target antenna group set includes some of the N antenna groups, or the target antenna group set includes the N antenna groups; obtain a phase difference corresponding to each antenna group in the target antenna group set, where the phase difference corresponding to the antenna group is a difference between phases when a signal transmitted by the antenna group reaches any two of the at least three probes; for each antenna group in the target antenna group set, calculate a measured wave path difference of the antenna group based on the phase difference corresponding to the antenna group, where the measured wave path difference corresponding to the antenna group is a difference between wave paths when the signal transmitted by the antenna group reaches any two of the at least three probes; and determine the position error of each of the N antenna groups based on the measured wave path differences corresponding to all the antenna groups in the target antenna group set.

With reference to the first possible implementation of the second aspect, in a second possible implementation of the second aspect, the determining unit is specifically configured to calculate the measured wave path difference $d_i$ corresponding to the antenna group based on $d_i = \varphi_i \times \lambda \div 360$, where $\varphi_i$ is the $i^{th}$ phase difference corresponding to the antenna group in degrees; $\lambda$ is a wavelength of a signal transmitted by the antenna group; and i is an integer greater than or equal to 1.

With reference to the second possible implementation of the second aspect, in a third possible implementation of the second aspect, the determining unit is specifically configured to: for each antenna group in the target antenna group set, determine a predicted position error of the antenna group; determine a predicted wave path difference corresponding to the antenna group based on the predicted position error of the antenna group; substitute the measured wave path difference corresponding to each antenna group in the target antenna group set and the predicted wave path difference corresponding to each antenna group in the target antenna group set into an objective function; use a position error of an optimal solution when the objective function obtains a minimum value as the position error of each of the N antenna groups, where the objective function is used to represent a difference between the predicted wave path difference corresponding to the antenna group and the measured wave path difference corresponding to the antenna group, and the larger the difference between the predicted wave path difference corresponding to the antenna group and the measured wave path difference corresponding to the antenna group, the larger a value of the objective function.

With reference to the third possible implementation of the second aspect, in a fourth possible implementation of the second aspect, the objective function is: $E(x_1, x_2 \ldots x_k) = \sum_{i=1}^{M} (G_i - F_i(x_1, x_2 \ldots x_k))^2/M$, where the predicted position errors of the antenna array of the first device in k dimensions are $x_1, x_2 \ldots x_k$, the antenna array includes N antenna groups, M is the quantity of antenna groups in the target antenna group set, M is an integer greater than or equal to 1 and less than or equal to N, $G_i$ is the measured wave path difference corresponding to the $i^{th}$ antenna group in the M antenna groups, and $F_i(x_1, x_2 \ldots x_k)$ is the predicted wave path difference corresponding to the $i^{th}$ antenna group in the M antenna groups; and i is an integer greater than or equal to 1.

With reference to the second aspect, in a fifth possible implementation of the second aspect, the compensation unit is specifically configured to: determine a wave path of the signal transmitted by the antenna group to the target probe based on the actual position of the antenna group, determine the phase of the signal transmitted by the antenna group to the target probe based on the wave path of the signal transmitted by the antenna group to the target probe, and determine the phase compensation value of the antenna group to the target probe based on the phase of the signal transmitted by the antenna group to the target probe.

With reference to the second aspect, in a sixth possible implementation of the second aspect, the compensation unit is specifically configured to: determine an orientation of the antenna group relative to the target probe based on the actual position of the antenna group, determine an amplitude deviation of the signal that is transmitted by the antenna group and reaches the target probe based on the orientation of the antenna group relative to the target probe, and determine an amplitude compensation value of the antenna group for the target probe based on the amplitude deviation of the signal that is transmitted by the antenna group and reaches the target probe.

With reference to the second aspect, in a seventh possible implementation of the second aspect, the compensation unit is further configured to: for each of the N antenna groups, compensate, based on the phase compensation value of the antenna group, for a phase result that is obtained by the antenna group by receiving a signal transmitted by the target probe, to calibrate a phase of the signal transmitted by the target probe; and/or compensate, based on the amplitude compensation value of the antenna group, for an amplitude result that is obtained by the antenna group by receiving the signal transmitted by the target probe, to calibrate an amplitude of the signal transmitted by the target probe.

DESCRIPTION OF EMBODIMENTS

An embodiment of the present invention provides an antenna array amplitude-phase calibration system, which can measure amplitude and phase deviations caused by a device position error in the medium-near field distance, and provide data input for subsequent amplitude consistency compensation and phase consistency compensation, so as to ensure the amplitude consistency and phase consistency of a phased array antenna. In addition, the entire system is relatively small in space and size, and the amplitude and phase of the phased array antenna can be calibrated without the aid of a high-precision scanning apparatus, thereby greatly reducing the costs of the amplitude calibration and phase calibration and facilitating extensive deployment of the antenna array amplitude-phase calibration system.

Figure 1:
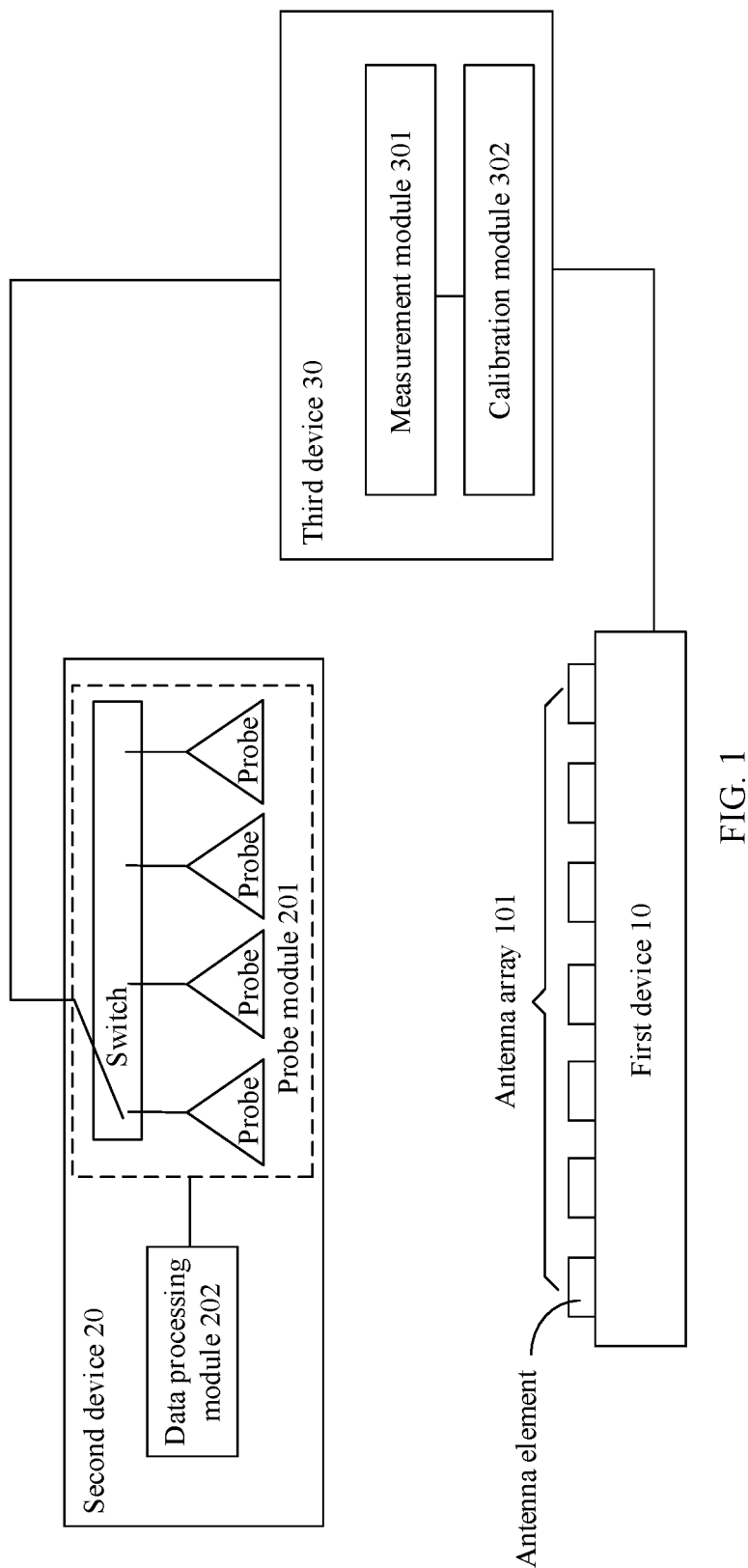
FIG. 1 is an architectural diagram of an antenna array amplitude-phase calibration system according to an embodiment of this application.

Referring to FIG. 1, the antenna array amplitude-phase calibration system includes a first device 10, a second device 20, and a third device 30. A distance between the first device 10 and the second device 20 is less than a far field boundary distance. The far field boundary distance is equal to $2d^2/\lambda$, where d is an antenna aperture of the first device, and $\lambda$ is a wavelength of a signal transmitted by the first device.

Specifically, the first device 10 includes N antenna groups 101, where N is an integer greater than 1. Each antenna group may include several antenna elements, the antenna group is the smallest unit whose amplitude and phase are controllable and also the smallest unit for amplitude-phase calibration. A plurality of antenna groups may form an antenna array, and each first antenna array includes a plurality of antenna arrays. The first device 10 is the object to be measured. The amplitude and phase between the antenna groups included in the first device need to be measured. The first device may be a base station or a terminal product having a phased array antenna. In this embodiment of the present invention, two adjacent antenna elements in a column may form an antenna group, and the forming of the antenna group is not limited in this embodiment of the present invention. In addition, the first device 10 needs to be able to individually control enabling/disabling of the transmission function of each antenna group and enabling/disabling of the reception function of each antenna group.

Referring to FIG. 1, the second device 20 is a device for testing an object to be measured, and the second device 20 may be a multi-probe assembly for testing signals, and includes a probe module 201. The probe module 201 includes at least three probes and a switch. The second device 20 can be switched between a plurality of probes by a switch to connect to on one of the probes in the probe module, and is able to individually control enabling/disabling of the transmission and reception of each probe. In addition, a relative position of the phase center of each probe is known, and the phase difference caused by the switch after each probe is connected to the switch is also known. The relative position and phase difference can be obtained in advance through calibration.

Referring to FIG. 1, the third device 30 is connected to the second device 20 and the first device 10, and the third device 30 includes a measurement module 301 and a calibration module 302. The measurement module 301 may measure the amplitude and phase of a signal received by the second device 20. The calibration module 302 may obtain a phase compensation value and an amplitude compensation value based on the amplitude and phase measured by the measurement module 301, and compensate for the measurement result of the second device 20. The third device 30 needs to be able to measure the amplitude and phase of a signal received by the probe of the second device 20, and to measure the amplitude and phase of a signal transmitted by an antenna group. In addition, the third device 30 needs to be able to calculate a position error of the antenna group based on the measurement result. During specific implementation, the third device 30 may be a computing module (program) integrated in the first device 10, or may be a separate device, for example, an independent meter (which may be a vector network analyzer), or a computing device.

Figure 2A:
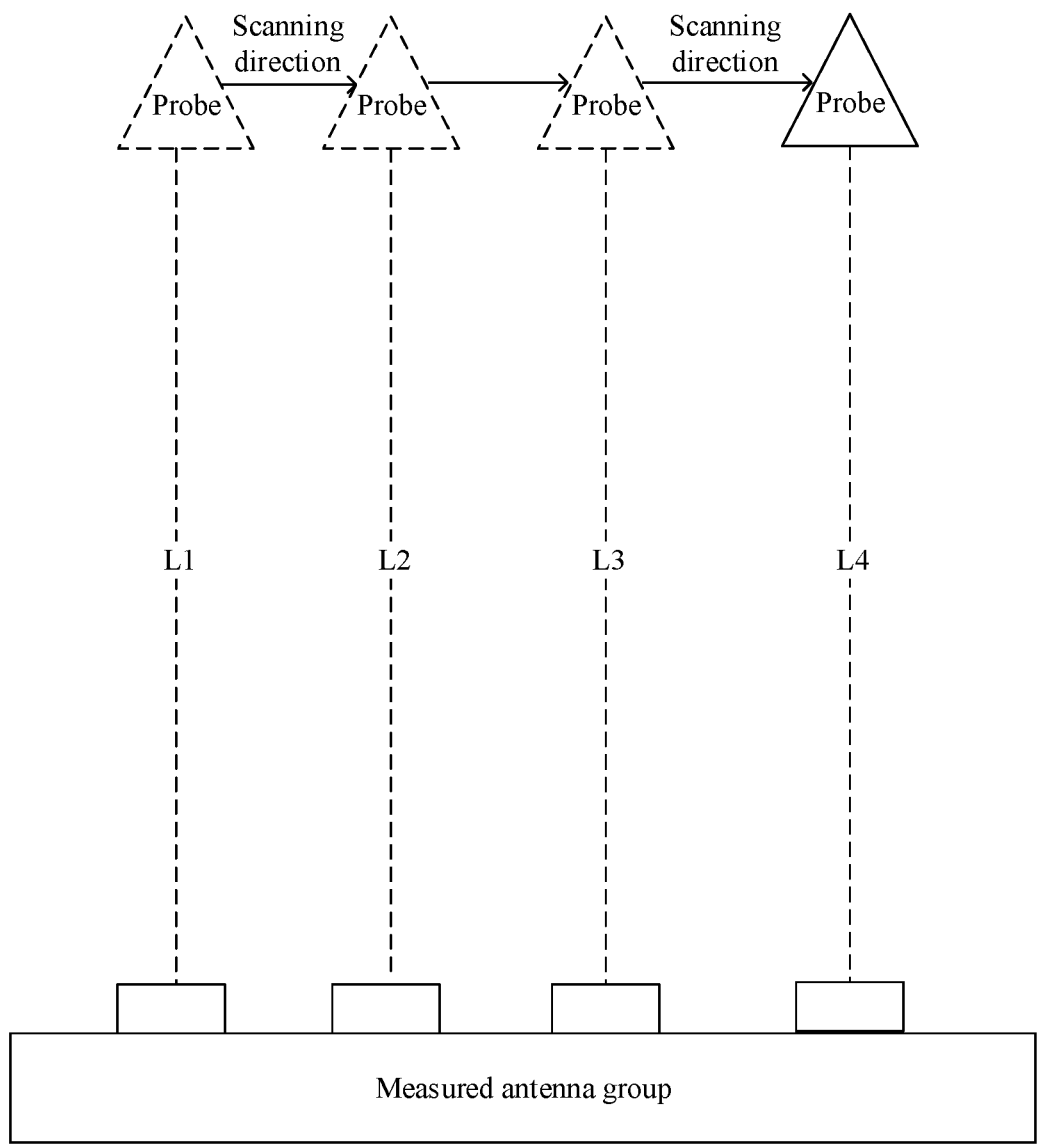
FIG. 2a is a schematic diagram of amplitude and phase measurements in the prior art.
Figure 2B:
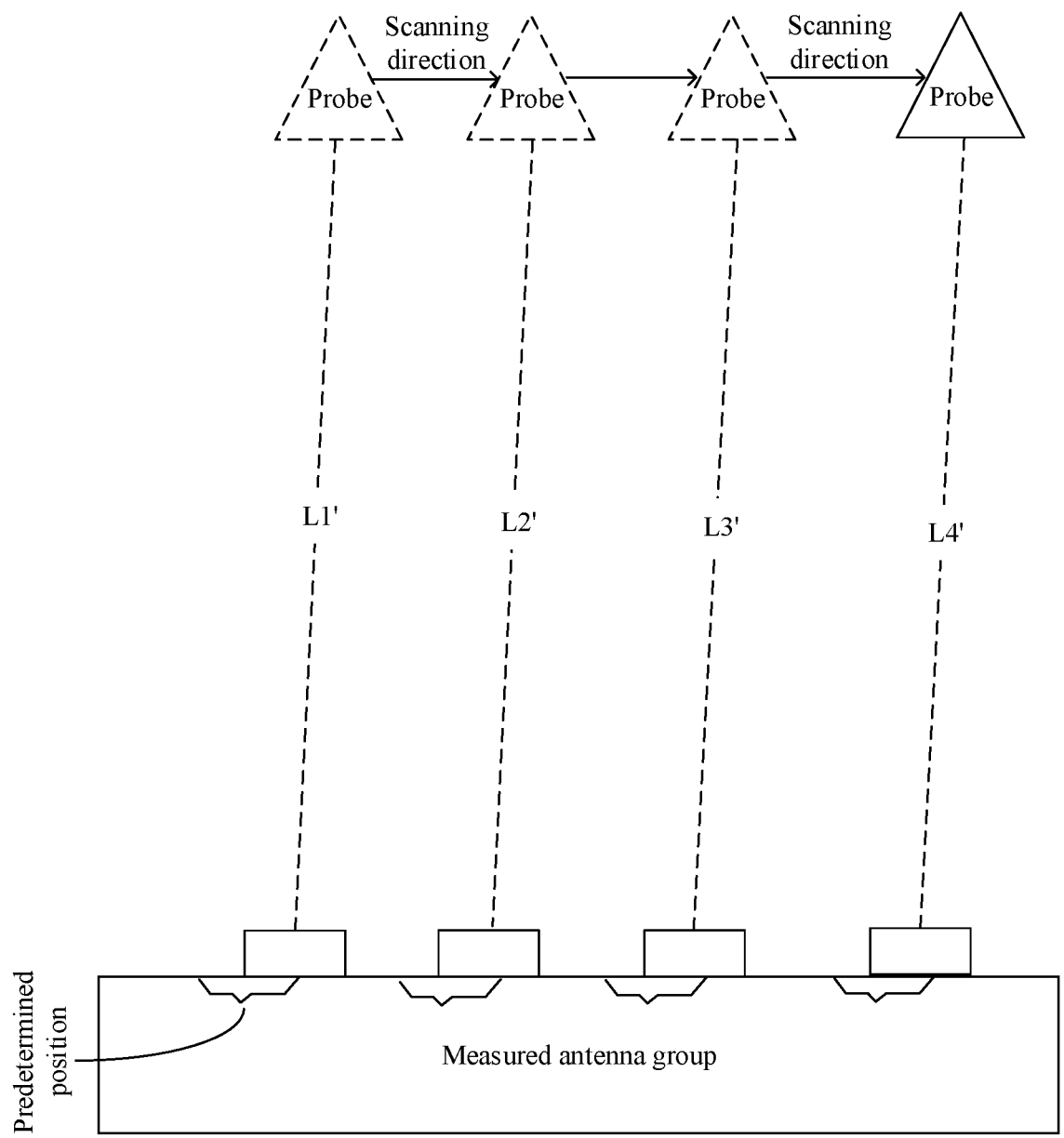
FIG. 2b is another schematic diagram of amplitude and phase measurements in the prior art.

In the prior art, a high-precision scanning apparatus can be used to ensure that the relative positions between the same probe and different antenna groups are consistent in the measurement process, thereby ensuring that the wave path and the gain between each antenna group and the probe are consistent, and the amplitude difference between the antenna groups can be directly calculated based on the scanning measurement result without compensation. The prior art requires low accuracy in a position of an antenna group to be measured. Referring to FIG. 2a, a distance between the probe and each antenna group is consistent during scanning movement of the probe. Referring to FIG. 2b, when an antenna group deviates from a predetermined position and a position error occurs, a high-precision scanning apparatus may be used to ensure that there is an error in the relative position between the probe and different antenna groups. That is, in FIG. 2b, even if the antenna group has a position error and deviates from a predetermined position, the high-precision scanning apparatus can ensure that L1'=L2'=L3'=L4' through scanning movement.

Figure 3:
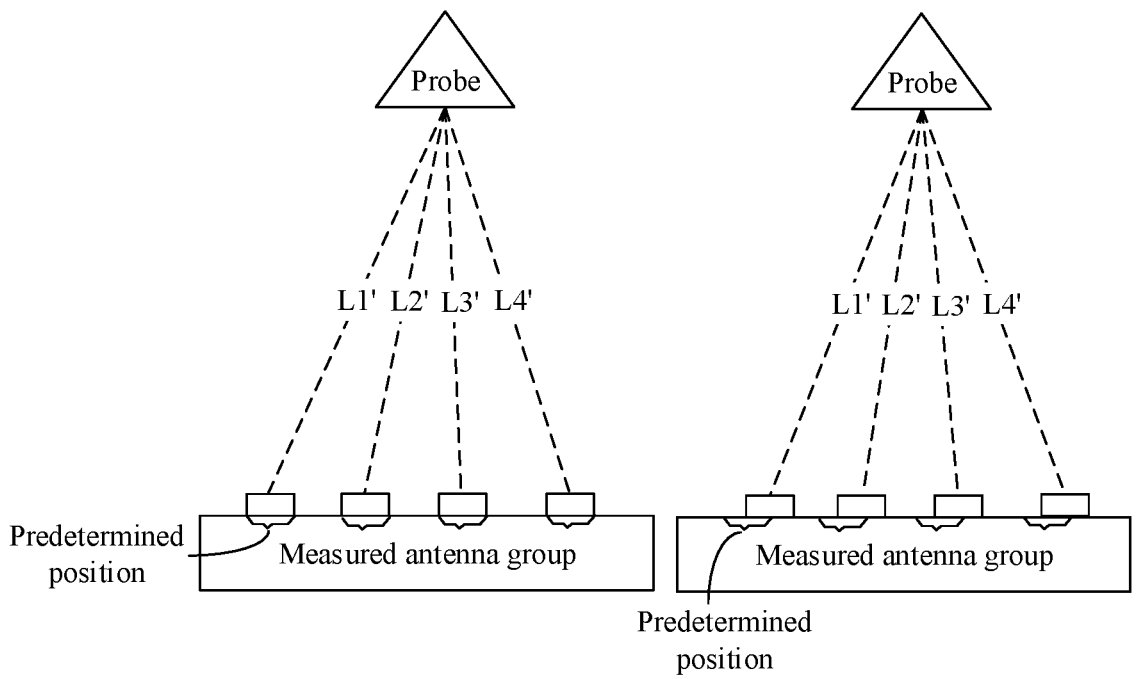
FIG. 3 is another schematic diagram of amplitude and phase measurements in the prior art.

Once signals transmitted by the antenna groups are measured using a fixed-position probe, it cannot be ensured that the relative positions between the probe and all the antenna groups are consistent. Referring to FIG. 3, there is an error in the position of the antenna group. When the antenna group deviates from the predetermined position, L1, L2, L3, and L4 change, and the relative relationship between L1, L2, L3, and L4 is different from the relationship between L1, L2, L3, and L4. Further, the amplitude/phase compensation is performed on the amplitude/phase value of the signal measured by the second device according to the relative position between the antenna group and the probe. Therefore, the position accuracy of the antenna group directly affects the accuracy of the compensation value. It can be seen that a high position accuracy of the antenna group to be measured is required in this scenario. In this embodiment of the present invention, in order to reduce costs, a high-cost scanning apparatus is no longer used, but an existing fixed probe is used to compensate for the amplitude and phase deviations caused by the position error of the antenna group. Therefore, in the calibration method provided in this embodiment of the present invention, it is necessary to ensure that the position error of the antenna group is sufficiently small, or to compensate for the position error.

During specific implementation, the third device 30 may obtain the wave paths of the signals transmitted by the antenna groups of the first device 10 to different probes of different second devices 20, and may further calculate the position errors of the antenna groups of the first device 10 according to the acquired wave paths. It is also possible to determine the actual position of the antenna group based on the position error of the antenna group, and then compensate, based on the actual position of the antenna group, for the amplitude result and the phase result that are obtained by the second device 20 by measuring the signal transmitted by the antenna group of the first device 10.

An embodiment of the present invention provides a calibration method, where the method is applied to the antenna array amplitude-phase calibration system shown in FIG. 1, and can calibrate a measurement result of a measurement device (that is, the second device in this embodiment of the present invention) within a medium-near field distance, and compensate for amplitude and phase deviations caused by an antenna group position error of the measured device (that is, the first device in this embodiment of the present invention). Specifically, a position error of each antenna group of the first device is first determined; the actual position of the antenna group is determined based on the target position of the antenna group and the position error of the antenna group, and further, the phase compensation value and/or the amplitude compensation value of the antenna group for the target probe may be determined based on the actual position of the antenna group. Finally, based on the measured signal phase result, the measured signal amplitude result is compensated for, and the measured signal phase result is compensated for. That is, according to this embodiment of the present invention, the amplitude and phase deviations caused by a hardware factor (for example, a position error) of the antenna group can be compensated for within a short distance by using a small-sized system, so that the amplitude consistency and phase consistency of the phased array antenna can be calibrated, and the performance of the phased array antenna is ensured. Further, the amplitude and phase of the phased array antenna can be calibrated by using an existing device of the device, without adding expensive devices such as a high-precision gantry and a turntable, thereby greatly reducing the costs and facilitating extensive deployment of the antenna array amplitude-phase calibration system.

Figure 4:
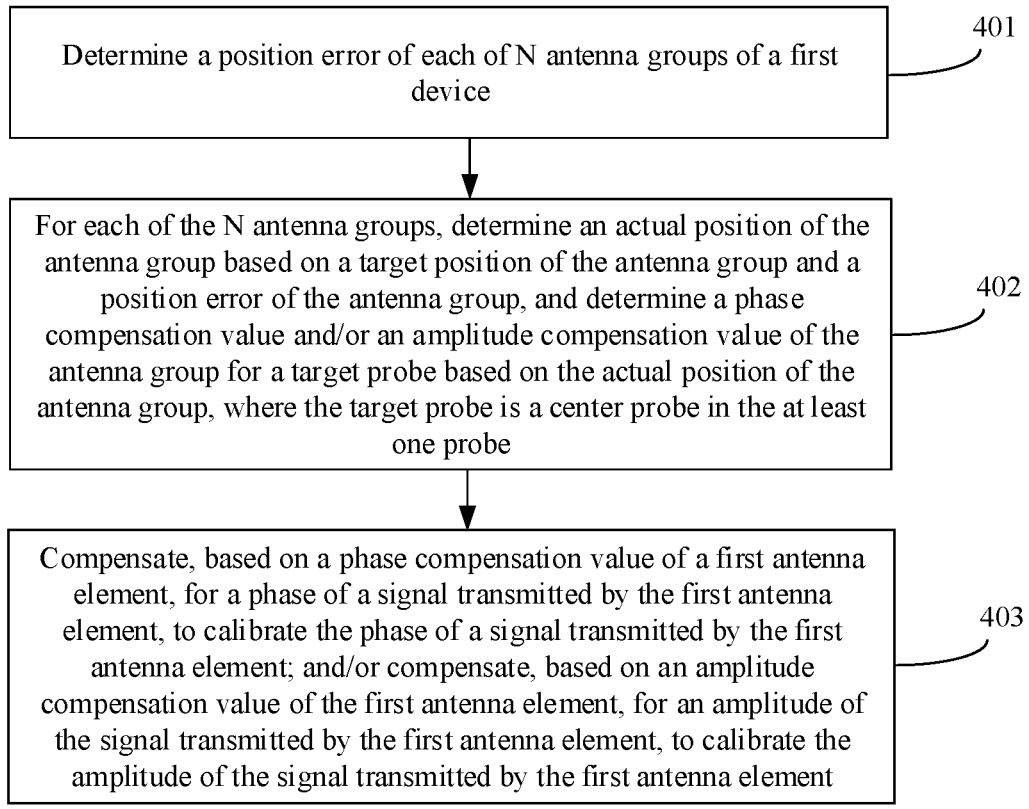
FIG. 4 is a schematic flowchart of a calibration method according to an embodiment of the present invention.

An embodiment of the present invention provides a calibration method, where the method is applied to the antenna array amplitude-phase calibration system shown in FIG. 1. As shown in FIG. 4, the method includes the following steps:

401. A third device determines a position error of each of N antenna groups of a first device.

In this embodiment of the present invention, a distance between the first device 10 and a second device 20 is less than a far-field boundary distance, that is, the amplitude and phase of a signal transmitted by the antenna group can be calibrated in the medium-near field. In addition, because the probe of the second device 20 is fixed, it is necessary to determine the position error of the antenna group of the first device. If the position error of the antenna group is known, an accurate measurement result can be obtained by compensating for the measurement result of the second device 20.

In an embodiment of the present invention, the phase center of the plurality of probes and the phase difference caused when the probe is connected to the switch are known. The third device 30 measures the phases of the signals transmitted by the same antenna group to different probes, removes the phase difference caused when the probes are connected to the switches, and obtains the phase difference when the signals transmitted by the same antenna group reach any two different probes, that is, the phase difference corresponding to one antenna group according to this embodiment of the present invention. For example, the probe module of the second device 20 includes three probes; a phase of a signal that is transmitted by antenna group 1 and reaches probe 1 is A, a phase of a signal that is transmitted by antenna group 1 and reaches probe 2 is B, and a phase of a signal that is transmitted by antenna group 1 and reaches probe 3 is C. The difference between the phase of the signal that is transmitted by antenna group 1 and reaches probe 1 and the phase of the signal that is transmitted by antenna group 1 and reaches probe 2 is A–B, the difference between the phase of the signal that is transmitted by antenna group 1 and reaches probe 1 and the phase of the signal that is transmitted by antenna group 1 and reaches probe 3 is A–C, and the difference between the phase of the signal that is transmitted by antenna group 1 and reaches probe 2 and the phase of the signal that is transmitted by antenna group 1 and reaches probe 3 is B–C. Therefore, the phase differences corresponding to antenna group 1 are A–B, A–C, and B–C. In some embodiments, the phase difference corresponding to the antenna group may be considered to be a phase difference corresponding to an independent combination of an antenna group and a probe group. The independent combination includes one antenna group and two probes, and the independent combination means that the corresponding phase difference of the combination cannot be derived from a known measurement result. For example, after the difference between the phase of the signal that is transmitted by antenna group 1 and reaches probe 1 and the phase of the signal that is transmitted by antenna group 1 and reaches probe 3 and the difference between the phase of the signal that is transmitted by antenna group 1 and reaches probe 1 and the phase of the signal that is transmitted by antenna group 1 and reaches probe 2 are known, the difference between the phase of the signal that is transmitted by antenna group 1 and reaches probe 2 and the phase of the signal that is transmitted by antenna group 1 and reaches probe 3 can be deduced. Therefore, it can be considered that antenna group 1, probe 1, and probe 3 form an independent combination, antenna group 1, probe 1, and probe 2 form an independent combination, and antenna group 1, probe 2, and probe 3 do not form an independent combination. Therefore, the phase differences corresponding to antenna group 1 are the phase differences corresponding to the independent combinations, that is, A–B and A–C.

Further, a wave path difference corresponding to an antenna group is inversely derived from the phase difference corresponding to the antenna group. The wave path difference corresponding to an antenna group is the wave path difference between the signals transmitted by the same antenna group and any two different probes. Through the above process, the wave path differences corresponding to all or some of the antenna groups of the first device 10 (that is, the target antenna group set in this embodiment of the present invention) can be obtained.

Finally, the wave paths from all or some of the antenna groups of the first device 10 to different probes are used as inputs of the objective function, and the position error is calculated by solving the optimal solution of the objective function. Generally, the relative positions of all antenna groups of the first device at the time of delivery can be considered to be certain, and the position errors of all the antenna groups at the time of delivery can also be considered to be the same. Therefore, the calculated position error can be used as the position error of all the antenna groups of the first device.

It should be noted that the phase center of an antenna group generally coincides with the geometric center of the antenna group. When the phase center of an antenna group generally does not coincide with the geometric center of the antenna group, the offset between the phase center and the geometric center of the antenna group can be obtained through measurement or simulation, and the phase center of the antenna group can be derived based on the geometric center of the antenna group.

During specific implementation, the position error of each of the N antenna groups can be determined by the following three steps.

Step (1): A plurality of antenna groups are first selected from N antenna groups to form a target antenna group set, or the target antenna group set may include all antenna groups of the first device 10. That is, the target antenna group set includes M antenna groups, where the antenna group is any one of the N antenna groups, and M is an integer greater than or equal to 1 and less than or equal to N.

Step (2): The third device 30 can measure a phase of a signal that is transmitted by each antenna group and reaches a probe, and can then obtain a phase difference corresponding to each antenna group in the target antenna group set, that is, the difference between the phase of the signal that is transmitted by the antenna group and reaches any two probes, and can further calculate the measured wave path difference corresponding to each antenna group in the target antenna group set based on the obtained phase difference, that is, the difference between the measured wave paths of the signal that is transmitted by the antenna group and reaches any two probes.

In some embodiments, the third device 30 may determine an independent combination of a probe and an antenna group, and determine a wave path difference, a phase difference, or the like based on the independent combination. The wave path difference corresponding to the antenna group may be considered as the wave path difference corresponding to all independent combinations of the antenna group and any two probes in the probe module. In this embodiment of the present invention, an antenna group and any two probes are referred to as an independent combination, and an independent combination corresponds to a wave path difference and a phase difference. For example, the target antenna group set includes two antenna groups: antenna group 0 and antenna group 1; and the probe module includes three probes: probe 1, probe 2, and probe 3. Antenna group 0, probe 1, and probe 2 are an independent combination, and antenna group 0, probe 2, and probe 3 are an independent combination. The difference between the phase of the signal that is transmitted by antenna group 0 and reaches probe 1 and the phase of the signal that is transmitted by antenna group 0 and reaches probe 3 can be derived based on the difference between the phase of the signal that is transmitted by antenna group 0 and reaches probe 1 and the phase of the signal that is transmitted by antenna group 0 and reaches probe 2, and based on the difference between the phase of the signal that is transmitted by antenna group 0 and reaches probe 2 and the phase of the signal that is transmitted by antenna group 0 and reaches probe 3. Therefore, antenna group 0, probe 1, and probe 3 are not an independent combination. It can be seen that one antenna group and three probes can form two independent combinations. Therefore, two antenna groups and three probes can form four independent combinations.

The M antenna groups and the three probes in the target antenna group set can form 2*M independent combinations. 2*M phase differences corresponding to the 2*M independent combinations can be obtained in step (2), and 2*M measured wave path differences corresponding to the 2*M independent combinations can be further obtained.

During specific implementation, 2*M independent combinations may be numbered as the first independent combination, the second independent combination, . . . , the $i^{th}$ independent combination, . . . , and the $(2*M)^{th}$ independent combination. The measured wave path difference corresponding to an independent combination can be determined based on the phase difference corresponding to the independent combination. Specifically, the measured wave path difference $d_i$ corresponding to the $i^{th}$ independent combination is calculated based on $d_i = \varphi_i \times \lambda \div 360$, where $\varphi_i$ is the phase difference corresponding to the $i^{th}$ independent combination in degrees; $\lambda$ is a wavelength of a signal transmitted by the antenna group; and i is an integer greater than or equal to 1 and less than or equal to 2*M.

In some embodiments, the wave path difference, the phase difference, and the like may also be determined based on an antenna group. The wave path difference corresponding to the antenna group may be considered as the wave path difference between the antenna group and any two probes in the probe module. Generally, when the signal transmitted by an antenna group reaches any two probes, there will be a phase difference. Using three probes as an example, one antenna group corresponds to three phase differences, and M antenna groups in a target antenna group set correspond to 3*M phase differences. Accordingly, 3*M measured wave path differences can be obtained based on the 3*M phase differences.

For example, the target antenna group set includes two antenna groups: antenna group 0 and antenna group 1; and the probe module includes three probes: probe 1, probe 2, and probe 3. The difference between the phase of the signal that is transmitted by antenna group 0 and reaches probe 1 and the phase of the signal that is transmitted by antenna group 0 and reaches probe 3 is denoted as a phase difference; the difference between the phase of the signal that is transmitted by antenna group 0 and reaches probe 1 and the phase of the signal that is transmitted by antenna group 0 and reaches probe 2 is denoted as a phase difference; and the difference between the phase of the signal that is transmitted by antenna group 0 and reaches probe 2 and the phase of the signal that is transmitted by antenna group 0 and reaches probe 3 is denoted as a phase difference. It can be seen that one antenna group corresponds to three phase differences. Likewise, antenna group 1 corresponds to three phase differences.

Further, a measured wave path difference $d_i$ corresponding to the antenna group may be calculated based on $d_i = \varphi_i \times \lambda \div 360$, where $\varphi_i$ is the $i^{th}$ phase difference corresponding to the antenna group, $\lambda$ is a wavelength of the signal transmitted by the antenna group; and i is an integer greater than or equal to 1. Therefore, the measured wave path difference corresponding to each antenna group in the target antenna group set can be obtained.

Step (3): A position error of each of the N antenna groups is determined based on the measured wave path difference obtained in step (2).

It should be noted that the measured wave path difference obtained in step (2) may be measured wave path differences corresponding to all independent combinations of antenna groups and probes in the target antenna group set, or may be measured wave path differences corresponding to all antenna groups in the target antenna group set. This is not limited in this embodiment of the present invention.

In some embodiments, the third device 30 may set the position error of the antenna group as an unknown value, set the objective function that uses the position error as a variable, and solve the optimal solution of the objective function to obtain the position error of the antenna group. Specifically, the predicted position error of the antenna group is first determined through modeling for each antenna group in the target antenna group set. Specifically, the overall position error $x_1, x_2 \ldots x_k$ of the antenna array of the first device 10 in k dimensions may be predetermined; and in some embodiments, $x_1, x_2 \ldots x_k$ may refer to the position error of the center point of the antenna array. Further, the predicted position error of each antenna group may be calculated based on the position of each antenna group relative to the entire antenna array. Specifically, the predicted position error of each antenna group may be calculated based on the position of one antenna group relative to the center point of the antenna array, and the predicted position error of each antenna group may be expressed as a value based on the variable $x_1, x_2 \ldots x_k$. For example, the predicted position error of an antenna group may be specifically $(x_1+a), (x_2-b) \ldots (x_k+x)$.

It should be noted that $x_1, x_2 \ldots x_k$ may be a linear position error or a rotational positioning error whose dimension and specific setting are determined by the position error that may be generated during measurement. The relative position between the antenna groups is determined by the antenna design of the first device, and then the predicted position error of a single antenna group can be derived based on the overall predicted position error of the antenna array.

Then, for each antenna group, the predicted wave path difference corresponding to each independent combination of the antenna group and any two of the plurality of probes is calculated based on the predicted position error of the antenna group by using a geometric relationship, or the predicted wave path difference between the antenna group and any two of the plurality of probes is calculated based on the position error of the antenna group, that is, the predicted wave path difference corresponding to the antenna group according to the embodiment of the present invention. Specifically, the predicted wave path difference corresponding to the antenna group may be a function that uses the predicted position error of the antenna group as a variable. Because the predicted position error of each antenna group may be represented by $x_1, x_2 \ldots x_k$, the predicted wave path difference of the antenna group may also be expressed as a function $F_1(x_1, x_2 \ldots x_k)$ that uses $x_1, x_2 \ldots x_k$ as a variable. It should be noted that the overall predicted position error $x_1, x_2 \ldots x_k$ of the antenna array of the first device 10 is used to represent the predicted wave path difference of each antenna group. Because the positions of all antenna groups are different, the measured wave path differences from different antenna groups to different probes are also different; that is, for different antenna groups $F(x_1, x_2 \ldots x_k)$, are different after expansion, but the measured wave path differences can be expressed as the function $F_i(x_1, x_2 \ldots x_k)$.

For example, an independent combination includes antenna group 1, probe 1, and probe 2. Based on the position error $x_1, x_2 \ldots x_k$ of antenna group 1 and the geometrical position of antenna group 1 relative to antenna group 1 and probe 1, the difference between the wave path of the signal that is transmitted by antenna group 1 and reaches probe 1 and the wave path of the signal that is transmitted by antenna group 1 and reaches probe 2 can be calculated, that is, a predicted wave path difference corresponding to antenna group 1 can be a function expressed as an unknown value "$x_1, x_2 \ldots x_k$".

Further, the measured wave path difference obtained in step (2) and the predicted wave path difference obtained therein are substituted into an objective function, and a position error $x_1, x_2 \ldots x_k$ when the objective function obtains an optimal solution is used as a position error of each of the N antenna groups, where the objective function is used to represent a difference between the predicted wave path difference corresponding to the independent combination and the measured wave path difference corresponding to the independent combination.

In some embodiments, the position error may be calculated by using the measured wave path difference corresponding to the M antenna groups in the target antenna group set and the predicted wave path difference corresponding to the M antenna groups in the target antenna group set as inputs of the objective function. The objective function is:

$$E(x_1, x_2 \ldots x_k) = \Sigma_{i=1}^{M} (G_i - F_i(x_1, x_2 \ldots x_k))^2 / M \quad (1)$$

In equation (1), $G_i$ is the measured wave path difference corresponding to the $i^{th}$ antenna group in the M antenna groups, and $F_i(x_1, x_2 \ldots x_k)$ is the predicted wave path difference corresponding to the $i^{th}$ antenna group in the M antenna groups.

In some embodiments, the position error may be calculated by using the measured wave path difference corresponding to the P independent combinations formed by M antenna groups in the target antenna group set and the probe of the second device and the predicted wave path difference corresponding to the P independent combinations as inputs of the objective function. The objective function is:

$$E(x_1, x_2 \ldots x_k) = \Sigma_{i=1}^{P} (G_i - F_i(x_1, x_2 \ldots x_k))^2 / P \quad (2)$$

In equation (2), $G_i$ is the measured wave path difference corresponding to the $i^{th}$ independent combination in the P independent combinations, and $F_i(x_1, x_2 \ldots x_k)$ is the predicted wave path difference corresponding to the $i^{th}$ independent combination in the P independent combinations.

In step 401, the following points need to be noted:

First, the overall position error of the antenna array of the first device 10 needs to be predetermined based on the effect of the actual position error of the antenna group on the antenna group. For example, if the antenna group of the first device is a one-dimensional linear array, the prediction position error can be determined based on one-dimensional linearity; and if the antenna group of the first device is a two-dimensional array, and the predicted position error can be determined based on two-dimensional linearity. In addition, when the antenna group is inclined, the rotation variable of the antenna group needs to be considered when determining the prediction position error.

Second, a range of the position error needs to be predetermined, to keep the position error within a certain range, so as to avoid uncertainty of the wave path difference caused by periodic repetition of the phase difference. The periodically repeated phase difference is indistinguishable for the third device. For example, both the phase difference (N*360+φ) and the phase difference φ are the phase difference φ for the third device. In order to avoid that the periodic repetition of the phase difference causes the wave path difference to be uncertain, the phase difference may be limited to a range, for example, the phase difference does not exceed 90. Further, the range of the position error is limited based on the range of the phase difference, and the phase difference caused by the position error does not exceed 90.

Third, when the wave path difference corresponding to the independent combination is obtained based on the phase difference of the independent combination, the impact of the connection between the probe and the switch on the phase difference needs to be considered. For example, the impact of the phase difference from different probes to the switch is removed. That is, the original phase value obtained by measuring the signal that is transmitted by the antenna group of the first device and reaches the probe includes the phase difference caused when the probe is connected to the switch; and the phase difference caused when the probe is connected to the switch needs to be subtracted to obtain the phase of a signal that is transmitted by an antenna group and reaches a probe in this embodiment of the present invention. In a subsequent process, a position error is calculated based on the obtained phase.

For example, the difference between the phase of the signal that is transmitted by antenna group 0 and reaches probe 1 and the phase of the signal that is transmitted by antenna group 0 and reaches probe 3 is denoted as the phase difference A; the difference between the phase of the signal that is transmitted by antenna group 0 and reaches probe 1 and the phase of the signal that is transmitted by antenna group 0 and reaches probe 2 is denoted as the phase difference B. When the measured wave path difference is derived based on the phase differences A and B, the phase difference C generated after the switch of the second device is connected to probe 3 needs to be subtracted, that is, a measured wave path difference can be obtained based on the phase difference A−C, and a measured wave path difference can be obtained based on the phase difference B−C.

Fourth, i in equations (1) and (2) denotes the quantity of the measured wave path difference and the predicted wave path difference, there is a one-to-one correspondence between $F_i$ and $G_i$, $F_i$ is the predicted wave path difference corresponding to the $i^{th}$ independent combination, and $G^i$ is the predicted wave path difference corresponding to the $i^{th}$ independent combination. Alternatively, $F^i$ is the predicted wave path difference corresponding to the $i^{th}$ antenna group in the target antenna group set, and $G^i$ is the predicted wave path difference corresponding to the $i^{th}$ antenna group in the target antenna group set.

Fifth, the objective function may be set using the most commonly used least square method, an objective function in another form can be set in actual application. This is not limited in this embodiment of the present invention. Any function that represents the difference between the measured wave path difference and the predicted wave path difference can be used as the objective function.

Sixth, a specific algorithm for solving the target optimization problem is not limited in this embodiment of the present invention, and a plurality of mature algorithms can be used.

402. For each of the N antenna groups, determine an actual position of the antenna group based on a target position of the antenna group and a position error of the antenna group, and determine a phase compensation value and/or an amplitude compensation value of the antenna group for a target probe based on the actual position of the antenna group, where the target probe is a center probe in the at least one probe.

During specific implementation, the third device 30 may determine a wave path of the signal that is transmitted by the antenna group and reaches the target probe based on an actual position of the antenna group, determine a phase of the signal that is transmitted by the antenna group and reaches the target probe based on the wave path of the signal that is transmitted by the antenna group and reaches the target probe, and determine the phase compensation value of the antenna group for the target probe based on the phase of the signal that is transmitted by the antenna group and reaches the target probe; and/or, the third device 30 determines the orientation of the antenna group relative to the target probe based on the actual position of the antenna group, determines the amplitude of the signal that is transmitted by the antenna group and reaches the target probe based on the orientation of the antenna group relative to the target probe, and determines the amplitude compensation value of the antenna group for the target probe based on the amplitude of the signal that is transmitted by the antenna group and reaches the target probe.

It should be noted that when the system shown in FIG. 1 is actually deployed, a three-dimensional coordinate system can be created, and the first device and the second device can be deployed according to the requirements of the medium-near field, so that the three-dimensional coordinates of each antenna group and the three-dimensional coordinates of each probe can be obtained. Here, the third device 30 can obtain the wave path of the signal that is transmitted by the antenna group and reaches the probe by using a geometric algorithm (for example, an algorithm of distance between two spatial points) based on the three-dimensional coordinates corresponding to the actual position of the antenna group and the three-dimensional coordinates of the probe. In addition, the third device 30 may obtain the orientation of the antenna group relative to the probe based on the three-dimensional coordinates corresponding to the actual position of the antenna group and the three-dimensional coordinates of the probe by using a geometric algorithm (such as a cosine theorem or a sine theorem).

Figure 5:
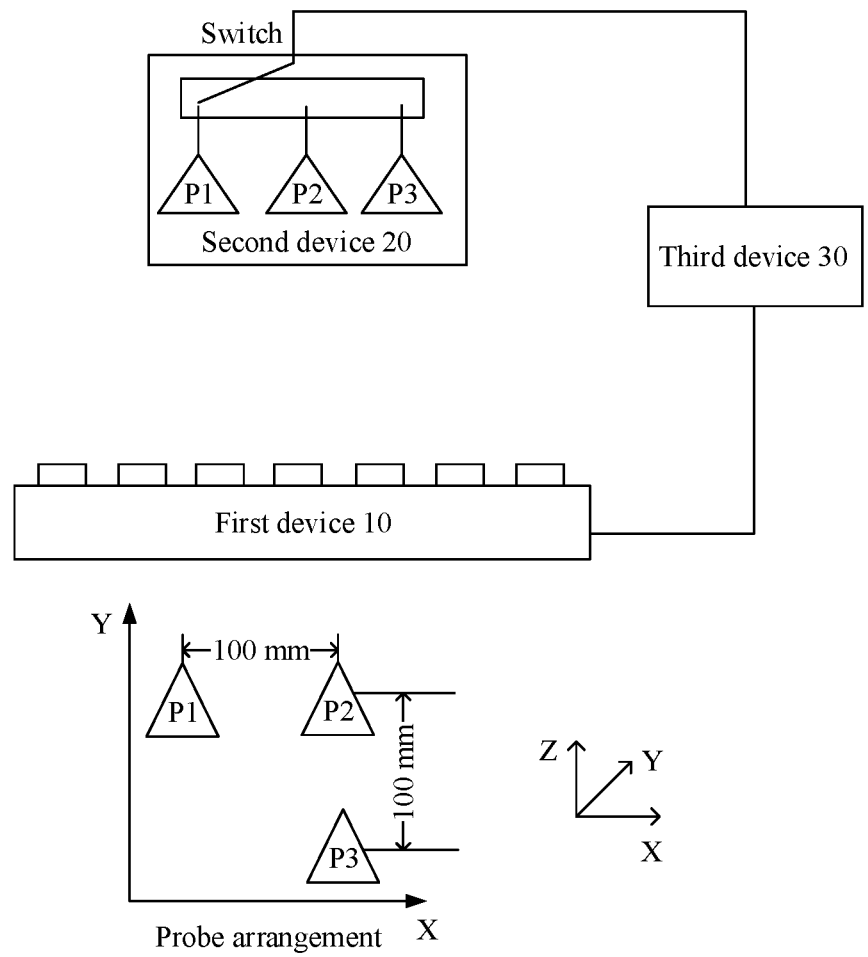
FIG. 5 is a schematic diagram of an antenna array amplitude-phase calibration system according to an embodiment of the present invention.

The orientation of the antenna group relative to the probe may be an azimuth or a pitch angle of the antenna group relative to the probe. Referring to FIG. 5, the line L from the center point of each antenna group to the center point of the probe can first be determined, and the azimuth and the pitch angle of the antenna group relative to the probe can be determined based on the normal S between the line L and the probe. In this embodiment of the present invention, the azimuth between the line L from the center of the antenna group to the center of the measurement probe and the normal S of the measurement probe is the angle between the projection of the line L on the horizontal plane and the normal S of the measurement probe. The pitch angle between the line L from the center of the antenna group to the center of the measurement probe and the normal line S of the measurement probe is the angle between the projection of the line L on the vertical plane and the normal line S of the measurement probe.

Further, a gain reduction value corresponding to the azimuth of the antenna group and a gain reduction value corresponding to the pitch angle of the antenna group can be obtained by comparing the directivity pattern of the antenna group. The sum of the two gain reduction values is the gain reduction value $\nabla 1$ of the antenna group. The gain reduction value of the antenna group may be considered as the transmission gain loss of the antenna due to the included angle between the antenna and the direction of the main beam and the probe. Further, a gain reduction value corresponding to the pitch angle of the antenna group and a gain reduction value corresponding to the pitch angle of the antenna group are obtained by comparing the directivity pattern of the probe, and the sum of the two gain reduction values is the gain reduction value $\nabla 2$ of the probe. The gain reduction value of the measurement probe may be considered as the loss of the receiving gain of the probe due to the angle between the antenna and the direction of the main beam and the angle between the antenna and the probe. The sum of the gain reduction value of the antenna group and the gain reduction value of the probe is used as the amplitude compensation value of the antenna group.

It should be noted that a correspondence between an included angle of an antenna and a transmission gain loss is recorded in the directivity pattern of the antenna group, and the transmission gain loss can be determined by comparing the determined included angle of the antenna with the directivity pattern of the antenna group; and the correspondence between the included angle of the antenna and the receiving gain loss is recorded in the directivity pattern of the measurement probe, and the receiving gain loss can be determined by comparing the determined included angle of the antenna with the directivity pattern of the measurement probe.

403. Compensate, based on a phase compensation value of the antenna group, for a phase result that is obtained by the target probe by measuring a signal transmitted by the antenna group, to calibrate a phase of the signal transmitted by the antenna group; and/or compensate, based on an amplitude compensation value of the antenna group, for an amplitude result that is obtained by the target probe by measuring the signal transmitted by the antenna group, to calibrate an amplitude of the signal transmitted by the antenna group.

During specific implementation, the measurement result of the target probe can be calibrated, that is, the phase compensation value is added to the phase of the antenna group measured by the target probe, so as to obtain an accurate measurement result. The phase compensation value of the antenna group may be a positive value or a negative value. In addition, an amplitude compensation value can be added to the amplitude of the antenna group measured by the target probe, so as to obtain an accurate measurement result. Likewise, the amplitude compensation value of the antenna group may be a positive value or a negative value.

In some embodiments, the antenna group of the first device may also receive the signal transmitted by the probe of the second device. In the method provided in the embodiment of the present invention, the third device may also compensate, based on the phase compensation value and the amplitude compensation value, for the amplitude result and the phase result of the signal that are received by the antenna group. Specifically, for each of the N antenna groups, the third device compensates, based on a phase compensation value of the antenna group, for a phase result that is obtained by the target probe by receiving a signal transmitted by the antenna group, to calibrate a phase of the signal transmitted by the target probe; and/or compensates, based on the amplitude compensation value of the antenna group, for the amplitude result that is obtained by the target probe by receiving the signal transmitted by the antenna group, to calibrate an amplitude of the signal transmitted by the target probe.

The following describes in detail the measurement method provided in this embodiment of the present invention by using a base station including 128 phased array antennas as an example. Referring to FIG. 5, the probe module of the first device includes three probes (P1, P2, and P3) arranged in an L-shape. Further, the plane formed by the phase centers of the three probes is perpendicular to the normal direction of the probes. The three probes are connected to a three-way switch, and the switch can be connected to a probe. The distance between the probe and the array surface of the measured antenna group is 0.5 m. The positions of the three probes and the phase difference after the three-way switch is connected to a probe are known. Certainly, the exact positions of the three probes and the exact phase difference after the three-way switch is connected to a probe may alternatively be obtained through calibration.

In addition, the 128 phased array antennas of the base station are arranged in 8 rows*16 columns, so that signals can be transmitted or received. The spacing between every two phased array antennas is 0.6λ, where λ is the wavelength of the signal transmitted at the test frequency in the transmission medium. The test frequency may be a measured device, such as a first device or a base station in this embodiment of the present invention. Two adjacent phased array antennas in a column form an antenna group, and 128 phased array antennas may form 64 independent antenna groups.

During specific measurement, the target antenna group set is first determined among 64 independent antenna groups. For example, eight antenna groups may be randomly selected to form a target antenna group set.

First, the eight antenna groups in the target antenna group set first transmit signals at the frequency 28 GHz, and the other antenna groups first do not reflect signals. Each of the three probes can receive the signals transmitted by the eight antenna groups, the third device measures the phases of the signals transmitted by each of the eight antenna groups to different probes, and the phase difference caused when the probe is connected to the switch needs to be removed. It should be noted that one antenna group and three probes may form two independent combinations, and therefore eight antenna groups and three probes may form 16 independent combinations.

Further, the phase difference corresponding to each of the 16 independent combinations can be calculated based on the obtained phase, and the obtained phase difference is converted into the measured wave path difference to obtain the measured wave path difference corresponding to each of the 16 independent combinations, where i=1, 2, . . . , 16.

In the system shown in FIG. 5, linear position errors may occur in the x-axis, y-axis, and z-axis directions of the antenna group, that is, k=3. Therefore, the positional errors of the antenna groups are represented by positional errors in the three directions of the x-axis, the y-axis, and the z-axis, and may be set to x1, x2, and x3. The predicted wave path difference $F_i(x_1, x_2, x_3)$ corresponding to each independent combination is calculated based on the geometric relationship, where i=1, 2, . . . , 14.

Next, an objective function is defined:

$$E(x_1,x_2,x_3)=\Sigma_{i=1}^{16}(G_i-F_i(x_1,x_2,x_3))^2/16 \ E(x1,x2,x3)=\Sigma_{i=1}^{14}(G_i-F_i(x1,x2,x3))^2/14;$$

The objective function is solved to obtain the optimal solution that minimizes E (x1, x2, x3), and x1, x2, and x3 obtained when the optimal solution is obtained are determined as the position errors of all antenna groups. It should be noted that the range of $x_1$, $x_2$, $x_3$ is predetermined, for example, −5 mm to 5 mm.

Then, the actual positions of the 64 antenna groups are calculated based on the calculated x1, x2, x3, and the phase compensation value and the amplitude compensation value of each antenna group relative to the center probe are calculated based on the actual positions of the antenna groups.

Finally, the amplitude and phase of the signals that are transmitted by all the antenna groups and reach the center probe are measured with the center probe (that is, the target probe in this embodiment of the present invention, for example, P1 in FIG. 5). Then, based on the phase compensation value and the amplitude compensation value of the antenna group, the amplitude and phase results of the signals transmitted by the antenna group measured by the center probe are compensated for to obtain the amplitude and phase values of each antenna element after compensation.

Figure 6:
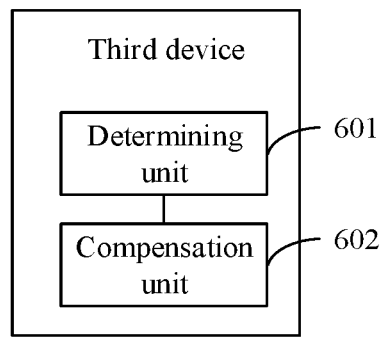
FIG. 6 is a structural diagram of a third device according to an embodiment of the present invention.

An embodiment of the present invention provides a third device, where the third device may be a third device according to an embodiment of the present invention, such as the third device in the system shown in FIG. 1. When the respective function modules are divided based on the respective functions, FIG. 6 shows a possible structural diagram of the third device. As shown in FIG. 6, the third device includes a determining unit and a compensation unit.

The determining unit 601 is configured to support the third device in performing steps 401 and 402 in the foregoing embodiment and/or other processes for the technologies described herein.

The compensation unit 602 is configured to support the third device in performing step 403 in the foregoing embodiment and/or other processes for the technologies described herein.

It should be noted that all related content of the steps in the foregoing method embodiment may be cited in function descriptions of corresponding function modules, and details are not described herein again.

Figure 7:
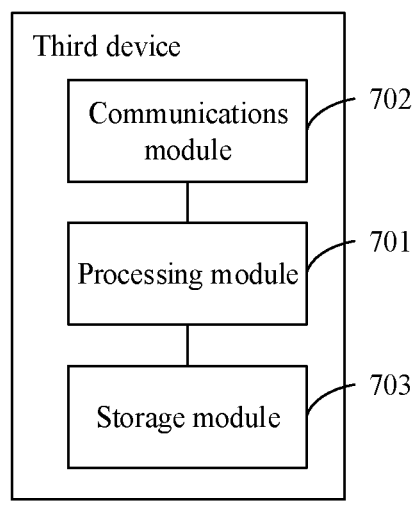
FIG. 7 is another structural block diagram of a third device according to an embodiment of the present invention.

For example, when an integrated unit is used, the third device provided in this embodiment of this application is shown in FIG. 7. In FIG. 7, the third device includes a processing module 701 and a communications module 702. The processing module 701 is configured to control and manage the actions of the third device, for example, to perform the foregoing steps performed by the determining unit 601 and the compensation unit 602, and/or is configured to perform other processes of the technologies described herein. The communications module 702 is configured to support interaction between the third device and other devices, such as the first device and the second device in the system shown in FIG. 1. As shown in FIG. 7, the third device may further include a storage module 703, where the storage module 703 is configured to store program code and data of the third device.

Figure 8:
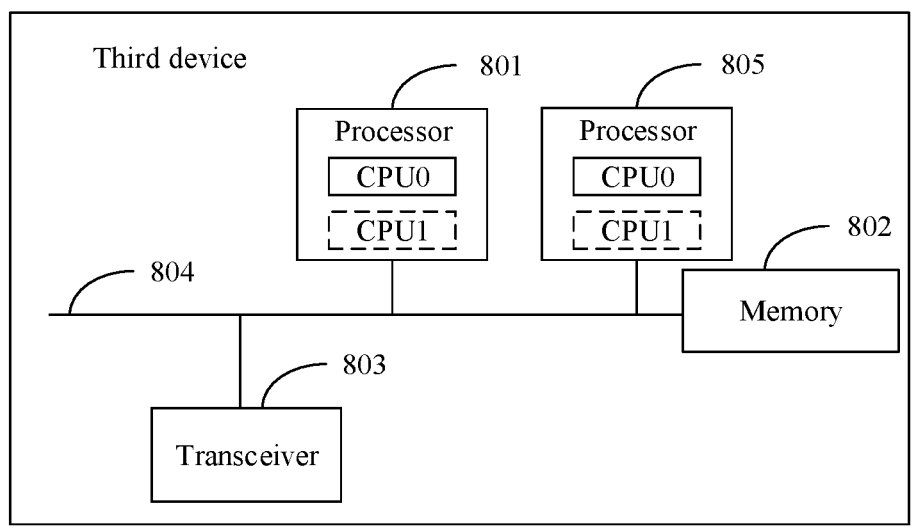
FIG. 8 is another structural block diagram of a third device according to an embodiment of the present invention.

The calibration method provided in the embodiments of the present invention may also be applied to the third device shown in FIG. 8. As shown in FIG. 8, the third device may include at least one processor 801, a memory 802, a transceiver 803, and a communications bus 804.

Components of the third device are described in detail below with reference to FIG. 8.

The processor 801 is the control center of the third device, and may be a processor or a general term for a plurality of processing elements. For example, the processor 801 is a central processing unit (CPU), may be an application specific integrated circuit (ASIC), or may be one or more integrated circuits configured to implement the embodiments of the present invention, such as one or more microprocessors (digital signal processor, DSP), or one or more field programmable gate arrays (FPGA).

The processor 801 may perform various functions of the third device by running or executing a software program stored in the memory 802 and invoking data stored in the memory 802.

During specific implementation, in an embodiment, the processor 801 may include one or more CPUs, such as CPU0 and CPU1 shown in FIG. 8.

During specific implementation, in an embodiment, the third device may include a plurality of processors, such as the processor 801 and a processor 805 shown in FIG. 8. Each of these processors may be a single-core processor (single-CPU) or a multi-core processor (multi-CPU). The processor herein may refer to one or more third devices, circuits, and/or processing cores for processing data, such as computer program instructions. The processor 801 is configured to perform steps 401-403 in the embodiments of the present invention, that is, to perform the foregoing steps performed by the determining unit 601 and the compensation unit 602, and/or is configured to perform other processes of the technologies described herein.

The memory 802 may be a read-only memory (ROM) or another type of static storage third device that can store static information and instructions, a random access memory (RAM) or another type of dynamic storage third device that can store information and instructions, or may be an electrically erasable programmable read-only memory (EE-PROM), a compact disc read-only memory (CD-ROM) or another optical disk storage, an optical disk storage (including a compact disc, a laser disc, an optical disc, a digital versatile disc, a Blu-ray disc, and the like), a magnetic disk storage medium, or another magnetic storage third device, or any other medium that can be used to carry or store desired program code in the form of instructions or data structures and that can be accessed by a computer. However, the memory 802 is not limited thereto. The memory 802 may independently exist and be connected to the processor 801 by using the communications bus 804. The memory 802 may alternatively be integrated with the processor 801.

The memory 802 is configured to store a software program for implementing the present invention under control of the processor 801.

The transceiver 803 is configured to communicate with the first device and the second device. The transceiver 803 may be an antenna array of the third device. Certainly, the transceiver 803 may also be configured to communicate with communications networks such as Ethernet, radio access network (RAN), and wireless local area network (WLAN). The transceiver 803 may include a receiving unit for implementing a receiving function, and a transmitting unit for implementing a transmitting function. In this embodiment of the present invention, the transceiver 803 may also be a radio frequency transceiver for collecting and measuring microwave signals received by the second device, for example, measuring the amplitude and phase of a signal received by the second device (and transmitted by the first device) to provide data support for subsequent amplitude compensation and phase compensation. Certainly, the transceiver 803 may also collect and measure the amplitude and phase of the signal received by the first device and transmitted by the second device.

The communications bus 804 may be an industry standard architecture (ISA) bus, a peripheral component (PCI) bus, an extended industry standard architecture (EISA) bus, or the like. The bus may be classified into an address bus, a data bus, a control bus, and the like. For ease of illustration, only one thick line is used to represent the bus in FIG. 8, but this does not mean that there is only one bus or only one type of bus.

The structure of the third device shown in FIG. 8 does not constitute a limitation on the third device. The third device may include components more or fewer than those shown in FIG. 8, or combine some components, or have a different component arrangement. The functions of each unit and module shown in FIG. 6 and FIG. 7 can be implemented using the foregoing hardware.

The foregoing descriptions about implementations allow a person skilled in the art to clearly understand that, for the purpose of convenient and brief description, division of the foregoing function modules is used as an example for illustration. In actual application, the foregoing functions can be allocated to different function modules and implemented according to a requirement, that is, an inner structure of a database access apparatus is divided into different function modules to implement all or some of the functions described above.

In the several embodiments provided in this application, it should be understood that the disclosed database access apparatus and method may be implemented in other manners. For example, the described database access apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the database access apparatuses or units may be implemented in electronic, mechanical, or other forms.

The units described as separate parts may or may not be physically separate, and parts displayed as units may be one physical unit or more than one physical units, may be located in one position, or may be distributed on a plurality of network units. Some or all of the units may be selected according to actual needs to achieve the objectives of the solutions in the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A calibration method, applied to an antenna array amplitude-phase calibration system, wherein the antenna array amplitude-phase calibration system comprises a first device, a second device, and a third device connected to the first device and the second device, wherein the first device comprises N antenna groups, wherein N is an integer greater than 1, wherein the second device comprises at least three probes, wherein a distance between the first device and each of the at least three probes is less than a far field boundary distance, and wherein the calibration method comprises:

determining, by the third device, a position error of each of the N antenna groups;

for each of the N antenna groups, determining, by the third device, an actual position of an antenna group based on a target position of the antenna group and the position error of the antenna group, and determining, by the third device, at least one of a phase compensation value or an amplitude compensation value of the antenna group for a target probe based on the actual position of the antenna group, wherein the target probe is any one of the at least three probes; and for each of the N antenna groups, at least one of the following:

compensating, by the third device based on the phase compensation value of the antenna group, for a phase result that is obtained by the target probe by measuring a signal transmitted by the antenna group, to calibrate a phase of the signal transmitted by the antenna group; or compensating, based on the amplitude compensation value of the antenna group, for an amplitude result that is obtained by the target probe by measuring the signal transmitted by the antenna group, to calibrate an amplitude of the signal transmitted by the antenna group.

2. The calibration method according to claim 1, wherein the determining, by the third device, the position error of each of the N antenna groups comprises:

determining a target antenna group set, wherein the target antenna group set comprises some of the N antenna groups, or the target antenna group set comprises the N antenna groups;

obtaining a phase difference corresponding to each antenna group in the target antenna group set, wherein the phase difference corresponding to the antenna group is a difference between phases when the signal transmitted by the antenna group reaches any two of the at least three probes;

for each antenna group in the target antenna group set, calculating, a measured wave path difference of the antenna group based on the phase difference corresponding to the antenna group, wherein the measured wave path difference corresponding to the antenna group is a difference between wave paths when the signal transmitted by the antenna group reaches any two of the at least three probes; and determining the position error of each of the N antenna groups based on the measured wave path differences corresponding to all the antenna groups in the target antenna group set.

3. The calibration method according to claim 2, wherein the calculating, by the third device, a measured wave path difference of the antenna group based on the phase difference corresponding to the antenna group specifically comprises:

calculating the measured wave path difference $d_i$ corresponding to the antenna group based on $d_i = \varphi_i \times \lambda \div 360$, wherein $\varphi_i$ is a $i^{th}$ phase difference corresponding to the antenna group in degrees; $\lambda$ is a wavelength of the signal transmitted by the antenna group; and i is an integer greater than or equal to 1.

4. The calibration method according to claim 3, wherein the determining, by the third device, the position error of each of the N antenna groups based on the measured wave path differences corresponding to all the antenna groups in the target antenna group set specifically comprises:

for each antenna group in the target antenna group set, determining a predicted position error of the antenna group;

determining a predicted wave path difference corresponding to the antenna group based on the predicted position error of the antenna group;

substituting the measured wave path difference corresponding to each antenna group in the target antenna group set and the predicted wave path difference corresponding to each antenna group in the target antenna group set into an objective function; and using the position error of an optimal solution when the objective function obtains a minimum value as the position error of each of the N antenna groups, wherein the objective function is used to represent a difference between the predicted wave path difference corresponding to the antenna group and the measured wave path difference corresponding to the antenna group, and the larger the difference between the predicted wave path difference corresponding to the antenna group and the measured wave path difference corresponding to the antenna group, the larger a value of the objective function.

5. The calibration method according to claim 4, wherein the objective function is:

$$E(x_1, x_2 \ldots x_k) = \sum_{i=1}^{M} (G_i - F_i(x_1, x_2 \ldots x_k))^2 / M, \text{ wherein}$$

the predicted position errors of the antenna array of the first device in k dimensions are $x_1, x_2 \ldots x_k$, an antenna array comprises the N antenna groups, an M is a quantity of antenna groups in the target antenna group set, and M is an integer greater than or equal to 1 and less than or equal to N, and $G_i$ is the measured wave path difference corresponding to a $i^{th}$ antenna group in an M antenna groups, and $F_i(x_1, x_2 \ldots x_k)$ is a predicted wave path difference corresponding to the $i^{th}$ antenna group in the M antenna groups, wherein i is an integer greater than or equal to 1.

6. The calibration method according to claim 1, wherein the compensating, by the third device based on the phase compensation value of the antenna group, for a phase result that is obtained by the target probe by measuring a signal transmitted by the antenna group, to calibrate a phase of the signal transmitted by the antenna group comprises:

determining a wave path of the signal transmitted by the antenna group to the target probe based on the actual position of the antenna group;

determining the phase of the signal transmitted by the antenna group to the target probe based on the wave path of the signal transmitted by the antenna group to the target probe; and determining the phase compensation value of the antenna group to the target probe based on the phase of the signal transmitted by the antenna group to the target probe.

7. The calibration method according to claim 1, wherein the compensating, by the third device based on the amplitude compensation value of the antenna group, for an amplitude result that is obtained by the target probe by measuring a signal transmitted by the antenna group, to calibrate an amplitude of the signal transmitted by the antenna group comprises:

determining an orientation of the antenna group relative to the target probe based on the actual position of the antenna group, determining an amplitude deviation of the signal transmitted by the antenna group from the target probe based on the orientation of the antenna group relative to the target probe, and determining the amplitude compensation value of the antenna group for the target probe based on the amplitude deviation of the signal transmitted by the antenna group from the target probe.

8. The calibration method according to claim 1, wherein the method further comprises:

for each of the N antenna groups, compensating, by the third device at least one of following:

based on the phase compensation value of the antenna group, for the phase result that is obtained by the antenna group by receiving a signal transmitted by the target probe, to calibrate the phase of the signal transmitted by the target probe; or based on the amplitude compensation value of the antenna group, for the amplitude result that is obtained by the antenna group by receiving the signal transmitted by the target probe, to calibrate the amplitude of the signal transmitted by the target probe.

9. A communications device, wherein the device is a third device in an antenna array amplitude-phase calibration system, the antenna array amplitude-phase calibration system comprises a first device, a second device, and the third device connected to the first device and the second device, wherein the first device comprises N antenna groups, wherein N is an integer greater than 1, wherein the second device comprises at least three probes, wherein a distance between the first device and each of the at least three probes is less than a far field boundary distance; and wherein the third device comprises:

at least one processor, the at least one processor configured to execute instructions stored in a non-transitory medium to determine a position error of each of the N antenna groups, wherein the at least one processor is further configured to:

for each of the N antenna groups, determine an actual position of an antenna group based on a target position of the antenna group and the position error of the antenna group; and determine at least one of a phase compensation value or an amplitude compensation value of the antenna group for a target probe based on the actual position of the antenna group, wherein the target probe is any one of the at least three probes; and for each of the N antenna groups, at least one of:

compensate, by the third device based on the phase compensation value of the antenna group, for a phase result that is obtained by the target probe by measuring a signal transmitted by the antenna group, to calibrate a phase of the signal transmitted by the antenna group; or compensate, based on the amplitude compensation value of the antenna group, for an amplitude result that is obtained by the target probe by measuring the signal transmitted by the antenna group, to calibrate an amplitude of the signal transmitted by the antenna group.

10. The communications device according to claim 9, wherein the at least one processor is configured to:

determine a target antenna group set, wherein the target antenna group set comprises some of the N antenna groups, or the target antenna group set comprises the N antenna groups;

obtain a phase difference corresponding to each antenna group in the target antenna group set, wherein the phase difference corresponding to the antenna group is a difference between phases when the signal transmitted by the antenna group reaches any two of the at least three probes;

for each antenna group in the target antenna group set, calculate a measured wave path difference of the antenna group based on the phase difference corresponding to the antenna group, wherein the measured wave path difference corresponding to the antenna group is a difference between wave paths when the signal transmitted by the antenna group reaches any two of the at least three probes; and determine the position error of each of the N antenna groups based on the measured wave path differences corresponding to all the antenna groups in the target antenna group set.

11. The communications device according to claim 10, wherein the at least one processor is configured to calculate the measured wave path difference $d_i$ corresponding to the antenna group based on $d_i = \varphi_i \times \lambda \div 360$, wherein $\varphi_i$ is a $i^{th}$ phase difference corresponding to the antenna group in degrees; $\lambda$ is a wavelength of the signal transmitted by the antenna group; and i is an integer greater than or equal to 1.

12. The communications device according to claim 11, wherein the at least one processor is configured to:

for each antenna group in the target antenna group set, determine a predicted position error of the antenna group;

determine a predicted wave path difference corresponding to the antenna group based on the predicted position error of the antenna group;

substitute the measured wave path difference corresponding to each antenna group in the target antenna group set and the predicted wave path difference corresponding to each antenna group in the target antenna group set into an objective function; and using the position error of an optimal solution when the objective function obtains a minimum value as the position error of each of the N antenna groups, wherein the objective function is used to represent a difference between the predicted wave path difference corresponding to the antenna group and the measured wave path difference corresponding to the antenna group, and the larger the difference between the predicted wave path difference corresponding to the antenna group and the measured wave path difference corresponding to the antenna group, the larger a value of the objective function.

13. The communications device according to claim 12, wherein the objective function is:

$$E(x_1, x_2 \ldots x_k) = \Sigma_{i=1}^{M} (G_i - F_i(x_1, x_2 \ldots x_k))^2 / M, \text{ wherein}$$

the predicted position errors of an antenna array of the first device in k dimensions are $x_1, x_2 \ldots x_k$; the antenna array comprises the N antenna groups; an M is a quantity of antenna groups in the target antenna group set, and the M is an integer greater than or equal to 1 and less than or equal to N; and $G_i$ is the measured wave path difference corresponding to a $i^{th}$ antenna group in the an M antenna groups, and $F_i(x_1, x_2 \ldots x_k)$ is a predicted wave path difference corresponding to the $i^{th}$ antenna group in the M antenna groups, wherein i is an integer greater than or equal to 1.

14. The communications device according to claim 9, wherein the at least one processor is configured to:
   determine a wave path of the signal transmitted by the antenna group to the target probe based on the actual position of the antenna group;
   determine the phase of the signal transmitted by the antenna group to the target probe based on the wave path of the signal transmitted by the antenna group to the target probe; and
   determine the phase compensation value of the antenna group to the target probe based on the phase of the signal transmitted by the antenna group to the target probe.

15. The communications device according to claim 9, wherein the at least one processor is configured to:
   determine an orientation of the antenna group relative to the target probe based on the actual position of the antenna group;
   determine an amplitude deviation of the signal transmitted by the antenna group from the target probe based on the orientation of the antenna group relative to the target probe; and
   determine the amplitude compensation value of the antenna group for the target probe based on the amplitude deviation of the signal transmitted by the antenna group from the target probe.

16. The communications device according to claim 9, wherein the at least one processor is further configured to:
   for each of the N antenna groups, at least one of the following:
      compensate, based on the phase compensation value of the antenna group, for the phase result that is obtained by the antenna group by receiving the signal transmitted by the target probe, to calibrate the phase of the signal transmitted by the target probe; or
      compensate, based on the amplitude compensation value of the antenna group, for the amplitude result that is obtained by the antenna group by receiving the signal transmitted by the target probe, to calibrate the amplitude of the signal transmitted by the target probe.

* * * * *